United States Patent Office 2,953,542
Patented Sept. 20, 1960

2,953,542
STABILIZED POLYMER COMPOSITIONS

Ernst Stark, Gendorf, Upper Bavaria, and Manfred Albrecht and Georg Keicher, Gersthofen, near Augsburg, Germany, assignors to Farbwerke Hoechst Aktiengesellschaft vormals Meister Lucius & Brüning, Frankfurt am Main, Germany, a corporation of Germany No Drawing. Filed Dec. 11, 1956, Ser. No. 627,544

Claims priority, application Germany Dec. 15, 1955

2 Claims. (Cl. 260—45.7)

This invention relates to polymer compositions and to a process of preparing them. It is known that phenol compounds and terpene-substituted phenols may be added to natural or artificial caoutchouc or to mixtures thereof in order to increase the resistance of these substances to the action of oxygen and that the same effect is brought about by the addition of heterocyclic thioalcohols. It is also known that phenol compounds may be added to high pressure polyethylene to prevent an undesired increase in viscosity during the working up with access of air and to protect said polyethylene against the action of atmospheric oxygen when used for a prolonged time.

Now we have found and this is surprising that polyethylene, especially low pressure polyethylene, can be improved by incorporating into said polyethylene, in a proportion of between 0.003% and 4%, preferably between 0.02% and 1%, aromatic thioalcohols, especially terpene-substituted aromatic thioalcohols, terpene thioalcohols and naphthene thioalcohols having a molecular weight of at least 150. Especially good results are obtained by carrying out the above process in the presence of 0.01% to 1% of an oxide of di-, tri- or tetravalent metals and/or the salts thereof with organic acids having at least 9 carbon atoms, preferably from 9 to 24 carbon atoms. Sometimes, the same effect may also be brought about without the addition of an oxide or a salt as specified above.

As aromatic thioalcohols there may be mentioned more especially: alpha-thionaphthol, beta-thionaphthol, 4,4'-mercaptodiphenyl- and 2-hexyl-alpha-thionaphthol; as terpene-substituted aromatic thioalcohols there may be used for example, isocamphyl-substituted thiophenol, menthyl-thionaphthol, iso-camphyl - 1.3 - dimercapto-naphthalene, and isobornyl-beta-thionaphthol; as terpene thioalcohols there may be employed for example, camphor beta-thiol, 2-menthyl-thiol, and isobornyl-thioalcohol; and as naphthene thioalcohols there may be used, for example 4-butyl-2-mercapto-cyclohexane, 2.6-di-tert.-butyl-4-mercapto-cyclohexane and 1 mercapto-3-phenyl-4-butyl-cyclopentane; as oxides or salts of di-, tri- or tetravalent metals may be used the oxides and salts of magnesium, calcium, boron, aluminium, iron and titanium; as organic acids come into consideration for example, octane-carboxylic acid, undecane-carboxylic acid, oleic acid, ricinoleic acid, pentadecane-carboxylic acid, heptadecane-carboxylic acid, and tricosane-carboxylic acid.

As compared with untreated polyethylene, the polyethylene treated by the process of this invention is much less liable to phenomena of ageing, such as an increase in crystallinity whereby the polyethylene becomes brittle under the influence of moderate heat and/or light. The improvement factor obtained may vary from 30 to 100. The term "improvement factor" as used herein means the number with which must be multiplied the time until the onset of the brittle state of untreated polyethylene to determine the time after which treated polyethylene becomes brittle under identical conditions.

The process of this invention offers this further advantage that the aforesaid additions practically do not impair the valuable electric properties of polyethylene and that the light color of the plastic material is preserved or only slightly changed. A further advantage offered by this invention resides in the fact that only very small amounts of the above-specified additions are necessary to bring about the desired effect. It suffices in many cases to use these additions in a proportion of only 0.04%. With some compounds the annoying odor appears less and less in the case of a molecular enlargement.

A uniform distribution of the additions in the plastic material is obligatory for the improvement of polyethylene and has a strong effect on the degree of the improvement factor. Such distribution may be performed by conventional methods, for example by a preliminary treatment in an effective mixing device in the case where a mixture with pulverulent constituents is concerned. However, also in this case it is again suitable thoroughly to mix the components with one another in a conventional manner, for example with the use of a roller or a kneader. The additions of this invention may also be incorporated into the polymers during the working up in the form of a solution or suspension or in some cases during the preparation of said polymers.

It is understood that stabilizers other than the above-specified additions, such as phenol compounds, for example 2.6 - di - tert. - butyl-para-cresol, 4.4'-dihydroxy-diphenyl, hydroquinone or soot may be used, and it is likewise possible to incorporate into the polymers other usual additions, such as dyestuffs, pigments and fillers.

The following example serves to illustrate the invention, but it is not intended to limit it thereto:

Example

Pulverulent low pressure polyethylene is mixed for 3 minutes in a mixing device (8000 revolutions per minute) with 0.1% of isobornyl-beta-thionaphthol and 0.08% of calcium oxide; the resulting pulverulent mixture is then given onto a mixing roller heated to 135° C. The sheet produced which is about 0.5 mm. thick is very carefully mixed and then withdrawn. Part of the sheet obtained is then pressed on a pressing device heated to 160° C. to obtain a 1 mm. thick film (pressing pressure: 50–150 kg./cm.$^2$, press time: 6 minutes). The film so produced is allowed to cool and then tempered at 120° C; it is found that this film takes about fifty times longer to become brittle than a sample treated under identical conditions but without the above specified additions.

We claim:

1. As a new composition of matter, polyethylene containing as an additive between 0.003–4% by weight of isobornyl-beta-thionaphthol, the latter serving to inhibit the embrittlement of the polyethylene due to ageing without impairing its electrical properties or color.

2. As a new composition of matter, polyethylene containing 0.003–4% isobornyl-beta-thionaphthol and 0.01–1% by weight of calcium oxide, these additives serving to inhibit the embrittlement of the polyethylene due to ageing without impairing its electrical properties or color.

References Cited in the file of this patent

UNITED STATES PATENTS

| | | |
|---|---|---|
| 2,160,172 | Rosen et al. | May 30, 1939 |
| 2,480,296 | Burk | Aug. 30, 1949 |
| 2,581,907 | Smith et al. | Jan. 8, 1952 |
| 2,727,879 | Vincent | Dec. 20, 1955 |

OTHER REFERENCES

"Polyethylene," Interscience Publishers Inc. (1956), New York, Raff et al., page 103 is relied on.